United States Patent
Stein

(10) Patent No.: US 10,520,612 B2
(45) Date of Patent: Dec. 31, 2019

(54) READOUT CIRCUITRY FOR PHOTOMULTIPLIER AND PHOTOMULTIPLIER

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 0 days.

(21) Appl. No.: 15/958,085

(22) Filed: Apr. 20, 2018

(65) Prior Publication Data
US 2018/0239035 A1   Aug. 23, 2018

Related U.S. Application Data

(63) Continuation of application No. PCT/EP2015/074282, filed on Oct. 20, 2015.

(51) Int. Cl.
*G01T 1/208* (2006.01)

(52) U.S. Cl.
CPC .................... *G01T 1/208* (2013.01)

(58) Field of Classification Search
CPC .................................................. G01T 1/208
See application file for complete search history.

(56) References Cited

U.S. PATENT DOCUMENTS

| 4,820,914 | A | * | 4/1989 | Allen | H01J 43/30 250/207 |
| 2007/0013899 | A1 | * | 1/2007 | Wolters | G01N 21/47 356/237.2 |
| 2015/0327827 | A1 | * | 11/2015 | Teshigawara | A61B 6/032 378/19 |

FOREIGN PATENT DOCUMENTS

WO   2012/080443 A1   6/2012

OTHER PUBLICATIONS

Chen et al.: "Front-end electronics for the CDF-II time-of-flight system", IEEE Transactions on Nuclear Science, vol. 50, No. 6, pp. 2486-2490, IEEE Service Center, New York, NY, Dec. 1, 2003.
International Search Report issued for International Patent Application No. PCT/EP2015/074282 dated Jun. 28, 2016.

* cited by examiner

*Primary Examiner* — Marcus H Taningco
(74) *Attorney, Agent, or Firm* — Myers Wolin, LLC

(57) ABSTRACT

Readout circuitry for a PMT is provided, which is adapted for delivering a pair of first and second synchronous output voltage signals to a pair of outputs, the first output signal of the pair having a first AC portion being representative of a charge flow of an anode of the PMT over time, the second output signal of the pair having a second AC portion which corresponds to an inverted form of the first AC portion of the first output signal. The readout circuitry comprises a first sub-circuitry which is adapted to derive the first output signal from the charge flow over time of the anode, and a second sub-circuitry which is adapted to derive the second output signal from a charge flow over time of at least one dynode of the PMT.

27 Claims, 3 Drawing Sheets

READOUT CIRCUITRY FOR PHOTOMULTIPLIER AND PHOTOMULTIPLIER

CROSS REFERENCE TO RELATED APPLICATIONS

This application is a continuation of International Application No. PCT/EP2015/074282, filed on Oct. 20, 2015, the contents of which are incorporated by reference herein.

TECHNICAL FIELD

The present invention relates to photomultipliers and their readout circuitry and regime, and scintillation detectors.

BACKGROUND

Scintillation detectors are used to measure and assess multiple types of ionizing radiation which includes alpha-, beta- and gamma rays, protons as well as neutrons and protons and other ionizing particles. Scintillation detectors are used in many different applications e.g., in environmental measurements, x-Ray systems, PET and SPECT scanners, computed tomography instruments, food monitors, oil logging and several spectrometers for quantitative and qualitative analysis as well as homeland security applications, especially radionuclide identifiers. Generally, the detectors may comprise a scintillation crystal, which converts the incident radiation to light pulses. The light pulses may then be detected and converted to electrical current using a photomultiplier (PMT). A PMT includes an anode and a plurality of dynodes, which may constitute a chain of dynodes. The anode and the dynodes may be connected to voltage sources which may include voltage dividers, to achieve signal amplification.

Until today, PMT signals are picked up at either electrode, at a dynode or at the anode.

Typically however, a photomultiplier is designed to deliver the output signal at the anode. The anode is the electrode where the maximum charge arrives after the multiplication stages at the dynode chain.

For further data processing, the photomultiplier output signals are digitized. Typically there are analog shaping circuits and followed by the digitization of the result. Today, sampling analog-digital converters (ADCs) are fast enough to digitize the anode or dynode currents continuously and avoid the analog shaping. The analog circuitry is replaced by digital signal processing.

Modern fast sampling ADCs, however, require differential input signals. Thus, the anode or dynode cannot be coupled directly to such ADC. Therefore, a BALUN circuit is needed. But BALUNs have certain disadvantages, apart from being just another component to be added. The amplification gain and for that matter the output current is typically high enough to drive an ADC input, so a BALUN does not have to be an active amplifier. Passive BALUNs, however have an unacceptable low frequency cutoff for photomultiplier readout applications. Active BALUNs comprise of active operational amplifiers, which add to the power budget and introduce additional noise and distortion.

Therefore, it is an object of the present invention to provide a readout circuit, PMT, and method to read out a PMT which alleviate at least partially the drawbacks of the known devices and methods as mentioned above.

SUMMARY

This object is solved by the devices and methods as defined in the respective independent claims. Further embodiments of the invention are defined in the dependent claims.

Thus, an aspect of the present invention is the readout circuit for the photomultiplier. Sensitive analog to digital converters may use differential signal inputs which require the input signal to be presented as two synchronous signals with opposite polarity. In order to convert a single ended signal which may come from the photomultiplier to a differential signal one may use an active or passive balanced-unbalanced converter. Another aspect of the disclosure is the use of passive components to create a differential signal.

The disclosure provides a readout circuitry for a PMT, which is adapted for delivering a pair of first and second synchronous output voltage signals, $U_{A\ out}^+$, $U_{A\ out}^-$, to a pair of outputs, $A^+_{out}$, $A^-_{out}$, the first output signal $U_{A\ out}^-$ of the pair having a first AC portion being representative of a charge flow of an anode of the PMT over time, the second output signal, $U_{A\ out}^-$, of the pair having a second AC portion which corresponds to an inverted form of the first AC portion of the first output signal, $U_{A\ out}^-$, the readout circuitry comprising:

a first sub-circuitry, $R_{AH}$, $R_{AL}$, which is adapted to derive the first output signal, $U_{A\ out}^-$, from the charge flow over time, $i_A$, of the anode, and a second sub-circuitry, $R_{DH}+R_{SL}$, which is adapted to derive the second output signal, $U_{A\ out}^-$, from a charge flow over time, $i_D$, of at least one dynode $D_N$, $D_{N-1}$, $D_{N-2}$, ..., of the PMT.

Thus, a couple of synchronous signals with opposite polarity may be derived directly from the PMT without the need of active electronic elements, thus avoiding the inherent noise of such active elements. On the other hand, passive BALUN circuitry (retardation lines) having poor frequency characteristics is avoided too.

Further embodiments can comprise the following features.

The first AC portion and the second AC portion may form a pair of differential signals.

Differential signals are particularly well suited for being processed by digital circuitry, such as ADC converters, following the readout circuitry.

The first output signal may further comprise a first DC portion, $U_{CENTER}+U_{MAX}/2$, and the other output signal may further comprise a second DC portion, $U_{CENTER}-U_{MAX}/2$.

Then, the output signals can be applied to circuitry requiring differential input signals having uniform polarity.

The first sub-circuitry may be AC-connectable to the anode, and the second sub-circuitry may be AC-connectable to the at least one dynodes, $D_N$, $D_{N-1}$, $D_{N-2}$, ....

By this, any high voltage supply voltage portion (DC portion) from the PMT electrodes (anodes or cathodes) is eliminated, e.g., originating from the applied acceleration voltages across the dynodes. Further, this allows to control the DC portions (bias) of the signals completely within the readout circuitry.

The first sub-circuitry may comprise a first voltage source circuit, $V_{DD}$, for setting the first DC portion of the first output signal, $U_{A\ out}^+$, and the second sub-circuitry may comprise a second voltage source circuit, $V_{DD}$, for setting the second DC portion of the second output signal, $U_{A\ out}^-$.

The first sub-circuitry may comprise first and second resistor elements, for setting the DC portion of the first output signal, $U_{A\ out}^+$, and the second sub-circuitry may comprise third and fourth resistor elements, for setting DC portion of the second output voltage, $U_{A\ out}^-$.

The first and second resistor elements may be connected in series between the first voltage source and a ground potential, and defining a common first connection point of the first and second resistor elements, the first resistor element being attached to ground, the second resistor element being attached to the first voltage source, the first connection point providing the first output signal, and further being AC connectable to the anode, the third and fourth resistor elements are connected in series between the second voltage source and the ground potential, and defining a common second connection point of the third and fourth resistor elements, the third resistor element being attached to ground, the fourth resistor element being attached to the second voltage source, the second connection point providing the second output signal, and further being AC connectable to the at least one dynode.

The first resistor element, being $R_{AL}$, the second resistor element, being $R_{AH}$, the third resistor element, being $R_{DL}$, and the fourth resistor element, being $R_{DH}$, may satisfy the following conditions for maximum one output voltage, $V_h$, and minimum other voltage, $V_l$, at maximum charge flow from the anode over time:

$$V_h = V_{CM} + U_{MAX}/2 = V_{DD} \cdot R_{AL}/(R_{AH} + R_{AL}),$$

$$V_l = V_{CM} - U_{MAX}/2 = V_{DD} \cdot R_{DL}/(R_{DH} + R_{DL}), \text{ and}$$

$$U_{MAX} = R_{AG} \cdot I_{MAX}$$

$$R_{AG} = R_{DG} \cdot G_{dyn}$$

with $$R_{AG} = (R_{AL} \cdot R_{AH})/(R_{AH} \cdot R_{AL}),$$

$$R_{DG} = (R_{DL} \cdot R_{DH})/(R_{DH} + R_{DL}),$$

where $V_{DD}$ being the voltage level of the first and second voltage sources, $V_{CM}$ being the mean of the output voltages, $U_{MAX}$ being a predetermined maximum voltage swing, $V_{CM} = (U_{A\ out}^+ + U_{A\ out}^-)/2$, $G_{dyn}$ being the current amplification gain of the at least one dynode, and $I_{MAX}$ corresponding to the maximum charge flow from the anode over time.

The charge flow over time of at least one dynode may be determined based on the charge flow of the one dynode nearest to the anode.

Then, the maximum charge flow at one dynode among the dynodes of the PMT is used.

The charge flow over time of at least one dynode charge may be determined based on at least one of the dynodes next to the one dynode nearest to the anode. Then, the total charge flow is larger, leading to a better signal coming from the dynodes to be exploited.

The first sub-circuit and the second sub-circuit may be composed of only passive elements.

Thus, the circuitry has particularly good noise characteristics, frequency characteristics, and can be implemented in a very cost-effective manner.

The first sub-circuitry may be AC-connectable to the anode via a capacitive element, $C_A$, and the second sub-circuitry is AC-connectable to the at least one dynodes, $D_N$, $D_{N-1}$, $D_{N-2}$, ..., via at least one capacitive element, $C_{DN}$, $C_{DN-1}$, $C_{DN-2}$, ....

Moreover, the readout circuitry may comprise capacitor element, $C_A$, for AC-connecting the anode to the first sub-circuitry, and at least one further capacitor element, $C_{DN}$, $C_{DN-1}$, $C_{DN-2}$, ..., each capacitor element AC-connecting a dynode of the at least one dynode, $D_N$, $D_{N-1}$, $D_{N-2}$, ..., with the second sub-circuitry.

The readout circuitry may further comprise a first output terminal, $A^+$, where the first output signal, $U_{A\ out}^+$, is provided, and a second output terminal, $A^-$, where the second output signal, $U_{A\ out}^-$, is provided.

The first output terminal, $A^+$, may be AC-connectable to the anode, and the second output terminal, $A^-$, may be AC-connectable to the at least one dynode.

Moreover, the readout circuitry may comprise a sampling device for converting the output signals to digital signals.

The disclosure further provides a PMT having a cathode, an anode, and a plurality of dynodes, $D_N$, $D_{N-1}$, $D_{N-2}$, ..., for the measurement of nuclear radiation, preferably gamma radiation, comprising a readout circuitry as describe before.

The PMT may further comprise a capacitor element, $C_A$, which AC-connects the anode, AN, to the first sub-circuitry, and at least one further capacitor element, $C_{DN}$, $C_{DN-1}$, $C_{DN-2}$, ..., each capacitor element AC-connecting a dynode of the at least one dynode, $D_N$, $D_{N-1}$, $D_{N-2}$, ..., with the second sub-circuitry.

Further, the disclosure provides a scintillation detector device, SC, comprising at least one PMT as described above.

Further, provided is a method for providing a pair of first and second synchronous output signals from a PMT, the first output signal of the pair having a first AC portion being representative of a charge flow of an anode of the PMT over time, the second output signal of the pair having a second AC portion which corresponds to an inverted form of the first AC portion of the first output signal, the first AC portion and the second AC portion forming a pair of differential signals, the method being adapted to:

derive the first output signal from the charge flow over time of the anode, and to derive the second output signal, $U_{A\ out}^-$, from a charge flow over time of at least one dynode, $D_N$, $D_{N-1}$, $D_{N-2}$, ..., of the PMT.

The first AC portion and the second AC portion may form a pair of differential signals.

The first output signal may further comprise a first DC portion, $U_{CENTER} + U_{MAX}/2$, and the second output signal further comprises a second DC portion, $U_{CENTER} - U_{MAX}/2$.

The first sub-circuitry may be AC-connectable to the anode, AN, and the second sub-circuitry is AC-connectable to the at least one dynode, $D_N$, $D_{N-1}$, $D_{N-2}$, ....

The method may further comprise setting the first DC portion of the first output signal, $U_{A\ out}^+$, by supplying a first voltage, $V_{DD}$, to the first sub-circuitry, and setting the second DC portion of the second output signal, $U_{A\ out}^-$, by supplying a second voltage, $V_{DD}$, to the second sub-circuitry.

Hereby, the charge flow over time of at least one dynode charge may be determined based on the one dynode nearest to the anode.

Hereby, the charge flow over time of at least one dynode charge may be determined based on at least one of the dynodes next to the one dynode nearest to the anode.

The method may further comprise AC-connecting the first sub-circuitry to the anode, AN, via a capacitive element, $C_A$, and AC-connecting the second sub-circuitry to the at least one dynodes, $D_N$, $D_{N-1}$, $D_{N-2}$, ..., via at least one capacitive element, $C_{DN}$, $C_{DN-1}$, $C_{DN-2}$, ....

The method may further comprise AC-connecting the anode, AN, to the first sub-circuitry via a capacitor element, $C_A$, and AC-connecting a dynode of the at least one dynode, $D_N$, $D_{N-1}$, $D_{N-2}$, ..., with the second sub-circuitry via at least one further capacitor element, $C_{DN}$, $C_{DN-1}$, $C_{DN-2}$, ....

The method may further comprise providing the first output signal, $U_{A\ out}^+$, to a first output terminal, $A^+$, of the readout circuitry, and providing the second output signal, $U_{A\ out}^-$, to a second output terminal, $A^-$, of the readout circuitry.

The method may further comprise AC-connecting the first output terminal, $A^+$, to the anode, and AC-connecting the second output terminal, $A^-$, to the at least one dynode.

The method may further comprise converting the output signals to digital signals.

Thus, the disclosure provides a circuit design which uses the anode together with the dynodes to form differential signals which are suitable to be used directly by modern sampling ADCs.

BRIEF DESCRIPTION OF THE DRAWINGS

The invention and embodiments thereof will be described in detail in the following with reference to the drawing, where.

DETAILED DESCRIPTION

Figure 1:
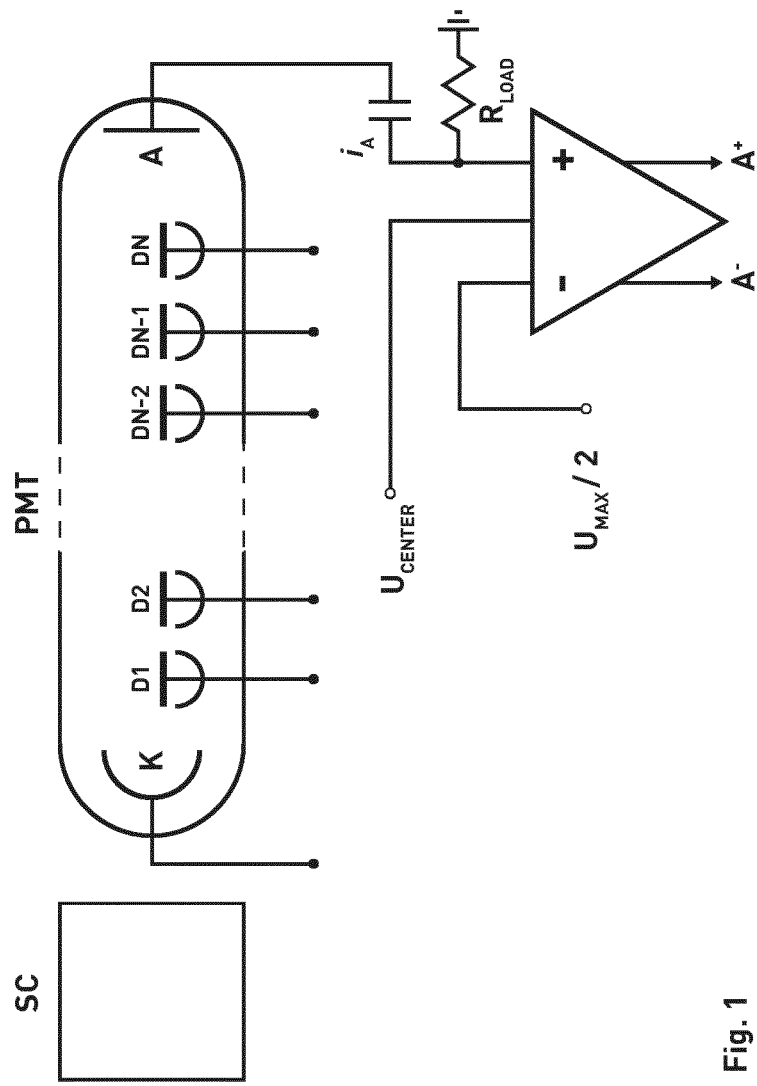
FIG. 1 illustrates a PMT with a read out circuitry as known in the art.

In FIG. 1, (as well as in FIG. 2) the PMT has a cathode K, an anode AN, and a plurality of dynodes DN arranged in a tube 10. The plurality of dynodes form a chain towards the anode, each dynode corresponding to a stage of amplification of the PMT. Not shown is the voltage divider circuitry which applies an acceleration voltage to each dynode of the dynode chain, the acceleration voltage for the respective dynode increasing towards the anode. Not shown in detail is the scintillator SC (if any) in front of the cathode of the PMT.

In order to deliver differential output signals, the read-out circuitry of the already known embodiment of FIG. 1 comprises a fully differential operation amplifier (pamp). A fully differential opamp is designed to provide a pair of synchronous AC output voltage signals $U_{A\ out}^+$, $U_{A\ out}^-$ whereby the one output voltage signal has an inverse form of the other one. Such signals are also denoted as differential signals. The output signals may be shifted by DC voltages (bias or offset voltages) such has they have always only one polarity, e.g., positive. The respective offset voltage has to be greater or equal to one halve of the maximum negative swing (amplitude) $U_{MAX}$ of the respective signal.

The offset voltage is the common mode voltage level $V_{CM}$.

The common mode voltage level $V_{CM}$ is set by clamping the center input of the differential opamp to that voltage. Although both output signals $U_{A\ out}^+$, $U_{A\ out}^-$ have always the same polarity (e.g., positive), the one signal may still be called the inverted signal of the other one, and the signals are still called differential signals.

The electrical charge flow $i_A$ from the PMT's anode is applied via a capacitive element $C_A$ to a load resistance $R_{LOAD}$, and flows then to ground. The voltage across $R_{LOAD}$ is captured by the opamp. The fully differential opamp provides at its outputs two synchronous signals over time, the first being representative of the charge flow at the anode, the second output signal having an inverted form thereof. To produce the inverted output signal, other input of the opamp is clamped to a voltage $U_{CENTER}U_{MAX}$, with $U_{MAX}$ being the maximum amplitude of the voltage across $R_{LOAD}$, i.e., the voltage to be captured by the opamp, and $U_{CENTER}$ being the common mode signal level $V_{CM}$.

Figure 2:
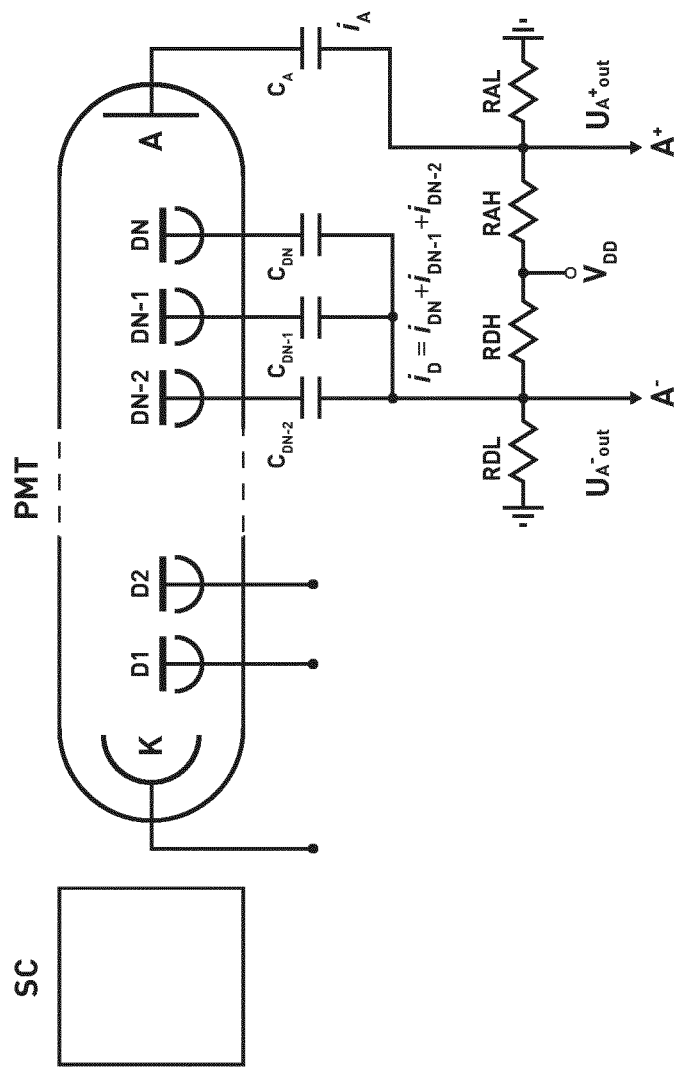
FIG. 2 illustrates a PMT with the circuitry according to an embodiment of the invention.

FIG. 2 illustrates an embodiment of the invention. The PMT is connected to a circuitry that produces the differential output signal pair. The PMT may be the same one as described with FIG. 1 above. But here, both differential signals are taken from the PMT directly. Hereby, the dynode signal almost exactly mirrors the anode signal with a small delay of one to e.g., three nanoseconds. The dynode signal has the opposite polarity and at a different magnitude than the anode. At each dynode, the respective signal is made of the difference of the incoming electrons minus the outgoing multiplied electrons.

Thus, according to an embodiment of the invention, the readout circuitry can be implemented with passive elements only.

In the following, this readout circuitry is described. Anode AN of the PMT is connected to a differential input node $A^+$ of the circuitry, and the upper dynode(s) is/are connected to differential input node $A^-$ of the circuitry. Anode and dynode(s) are AC-coupled by capacitors $C_A$, $C_{DN}$, $C_{DN-1}$, $C_{DN-2}$ ... with the readout circuitry. Behind the decoupling they are connected to two different voltage divider resistor networks, i.e., first and second sub-circuitry, respectively. $A^-$ is attached to the sub-circuitry consisting of resistor elements $R_{AH}$ and $R_{AL}$, while $A^+$ is attached to the sub-circuitry consisting of resistor elements $R_{DH}$ and $R_{DL}$. The charge flow from the anode is $i_A$, the charge flow from the dynodes is $i_D=i_{DN}+i_{DN-1}+i_{DN-2}+\ldots$, i.e., the sum of the charge flows of the dynodes connected to the readout circuitry. As mentioned above, the polarity of the current $i_A$ and $i_D$ are inverted to each other and may have different amplitudes (i.e., swing).

The resistors networks have two functions. The first function is a current to voltage conversion matching the desired ADC input range. The second function is maintaining a desired common mode DC voltage level. These two functions define 4 linear equations for the 4 resistor elements and determine their values uniquely.

$V_{DD}$ shall be an arbitrary voltage source which is larger than the maximum voltage $U_{MAX}$ that could be supplied to either node $A^+$ and $A^-$. $V_{CM}$ denotes the targeted common mode voltage level. Thus, $U_{MAX}$ denotes the maximum targeted voltage swing of the output voltage.

$G_{dyn}$, denotes the current amplification gain of the last PMT dynode stage, i.e., the dynode closest to the anode. It is the ratio of the dynode current to the anode current, $G_{dyn}=|i_D/i_A|$. $I_{MAX}$ denotes the targeted current flowing from the anode at which the full differential voltage swing is reached. The anode load $R_{AG}:=(R_{DH}\cdot R_{AL})/(R_{AH}+R_{AL})$ is the total resistance of the network at the anode. The dynode load $R_{DG}:=(R_{DH}\cdot R_{DL})/(R_{DH}+R_{DL})$ is similarly given at the dynode. At the maximum anode current, the maximum differential voltage swing shall be achieved. Hence, the current to voltage conversion defines the anode load with the first equation $$U_{MAX}/2 = R_{AG} \cdot I_{MAX} \qquad (1)$$

The ratio of $R_{AG}$ and $R_{DG}$ is determined by $G_{dyn}$ as the absolute voltages referred to the common mode voltage of $A^+$ and $A^-$ must always be equal. This is true if $$R_{AG} = R_{DG} \cdot G_{dyn} \quad (2)$$

At maximum anode current, the voltages at $A^+$ and $A^-$ are $V_h$ and $V_l$ respectively (refer to FIG. 3):

$$V_h = V_{CM} + U_{MAX}/2 = V_{DD} \cdot R_{AL}/(R_{AH} + R_{AL}) \quad (3)$$

$$V_l = V_{CM} - U_{MAX}/2 = V_{DD} \cdot R_{DL}/(R_{DH} + R_{DL}) \quad (4)$$

With $I_{MAX}$, $U_{MAX}$, $V_{DD}$, and $G_{dyn}$, the 4 equations can be resolved for the resistor networks delivering values for $R_{AL}$, $R_{AH}$, $R_{DL}$, and $R_{DH}$.

Assume now an ideal photomultiplier PMT with a dynode gain of 4 per dynode stage. That is, each dynode multiplies the arriving charge by 4. Then the current $i_{DN}$ at the highest dynode is 3/4 of the current $i_A$ at the anode AN, since we must subtract the charge arriving at the highest dynode $D_N$ from the dynode before, $D_{N1}$. Thus, if we were to use anode AN and only the highest dynode $D_N$ as differential signals, one leg would have asymmetrical less current.

However, almost all differential ADC inputs are voltage inputs. A single resistor is always required for the current to voltage conversion. With the suitable resistor ratios for the dynode and anode sub-circuits as described above, the absolute voltage at the resistor elements can be made equal for both output signals. Moreover, since the anode and dynode are AC-coupled to the readout circuitry, an arbitrary offset can be added by the use of voltage dividers. Now there are have four resistor elements which uniquely determine the adaptation of the dynamic range and offset of the differential output signal pair.

If more than one dynode are electrically summed by wiring the dynodes' outputs after capacitive decoupling, the afore mentioned ratio of 3/4 can be greatly improved to almost unity. In the example the two last dynodes would give a ratio of 15/16, the three last dynodes 63/64, the four last dynodes 255/256, and so on.

As an example, with $U_{MAX}=0.6$ V, $V_{DD}=1.8$ V, and $G_{dyn}=255/256$, the four resistor elements may have the following values:

$R_{AH}=497 \, \Omega$
$R_{AL}=750 \, \Omega$
$R_{DL}=410 \, \Omega$
$R_{DH}=1118 \, \Omega$,
and $C_A=10$ nF.

Figure 3:
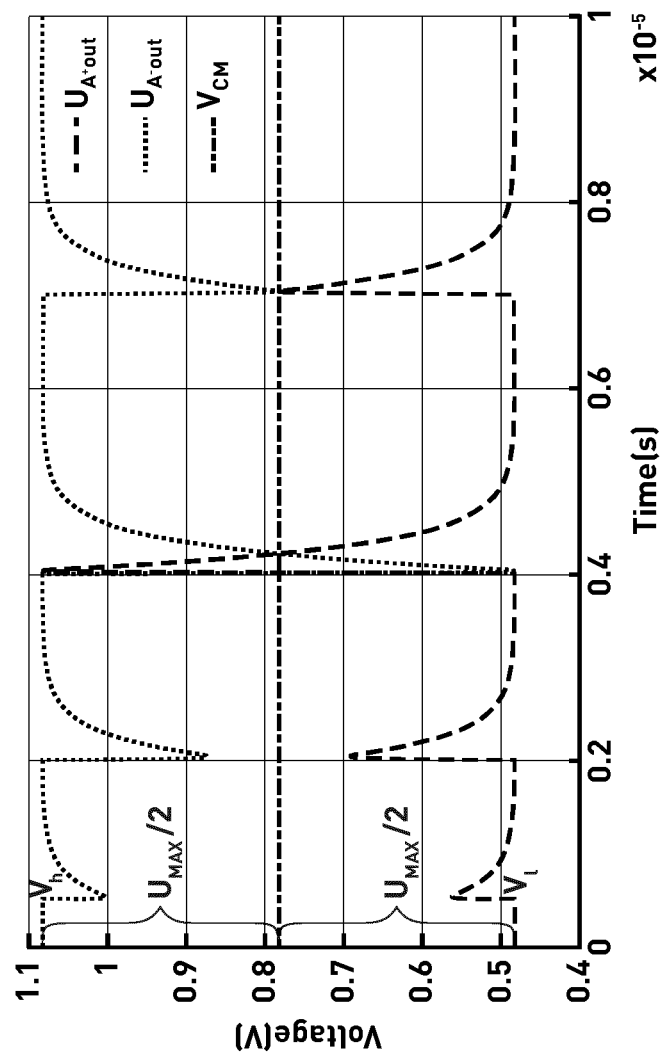
FIG. 3 illustrates output signals of the circuitry of the embodiment of the invention.

FIG. 3 illustrates typical output signals $U_{A\,out}^+$, $U_{A\,out}^-$ and common mode voltage $V_{CM}$ at the respective output terminals $A^+$ and $A^-$. As can be seen, the AC portions of $U_{A\,out}^+$, and $U_{A\,out}^-$ are a differential signal pair. That means, the AC portion of the one signal is an inverted form of the other signal, i.e., the signals they are symmetrical with respect to the common mode voltage $V_{CM}$, which is the center voltage $U_{CENTER}$.

The invention claimed is:

1. Readout circuitry for a PMT, which is adapted for providing a pair of first and second synchronous output signals ($U_{A\,out}^+$, $U_{A\,out}^-$), the first output signal ($U_{A\,out}^+$) of the pair having a first AC portion being representative of a charge flow of an anode (AN) of the PMT over time, the second output signal ($U_{A\,out}^-$) of the pair having a second AC portion which corresponds to an inverted form of the first AC portion of the first output signal ($U_{A\,out}^+$), the readout circuitry comprising:

a first sub-circuitry ($R_{AH}$, $R_{AL}$) which is adapted to derive the first output signal ($U_{A\,out}^+$) from the charge flow over time ($i_A$) of the anode (AN), and a second sub-circuitry ($R_{DH}+R_{DL}$) which is adapted to derive the second output signal ($U_{A\,out}^-$) from a charge flow over time ($i_D$) of at least one dynode ($D_N$, $D_{N-1}$, $D_{N-2}$, ...) of the PMT, wherein the first output signal further comprises a first DC portion ($U_{CENTER}+U_{MAX}/2$) and the second output signal further comprises a second DC portion ($U_{CENTER}-U_{MAX}/2$), wherein the first sub-circuitry comprises a first voltage source circuit ($V_{DD}$) for setting the first DC portion of the first output signal ($U_{A\,out}^+$) and the second sub-circuitry comprises a second voltage source circuit ($V_{DD}$) for setting the second DC portion of the second output signal ($U_{A\,out}^-$), wherein the first sub-circuitry comprises first and second resistor elements, for setting the DC portion of the first output signal ($U_{A\,out}^+$), and the second sub-circuitry comprises third and fourth resistor elements, for setting DC portion of the second output voltage ($U_{A\,out}^-$).

2. The readout circuitry of claim 1, wherein the first AC portion and the second AC portion form a pair of differential signals.

3. The readout circuitry of claim 1, wherein the first sub-circuitry is AC-connectable to the anode (AN), and the second sub-circuitry is AC-connectable to the at least one dynode ($D_N$, $D_{N-1}$, $D_{N-2}$, ...).

4. The readout circuitry of claim 1, wherein:

the first and second resistor elements are connected in series between the first voltage source and a ground potential, and defining a common first connection point of the first and second resistor elements, the first resistor element being attached to ground, the second resistor element being attached to the first voltage source, the first connection point providing the first output signal, and further being AC connectable to the anode, the third and fourth resistor elements are connected in series between the second voltage source and the ground potential, and defining a common second connection point of the third and fourth resistor elements, the third resistor element being attached to ground, the fourth resistor element being attached to the second voltage source, the second connection point providing the second output signal, and further being AC connectable to the at least one dynode.

5. The readout circuitry of claim 4, wherein the first resistor element, being $R_{AL}$, the second resistor element, being $R_{AH}$, the third resistor element, being $R_{DL}$, and the fourth resistor element, being $R_{DH}$, satisfy the following conditions for maximum one output voltage, $V_h$, and minimum other voltage, $V_l$, at maximum charge flow from the anode over time:

$$V_h = V_{CM} + U_{MAX}/2 = V_{DD} \cdot R_{AL}/(R_{AH}+R_{AL}),$$

$$V_l = V_{CM} - U_{MAX}/2 = V_{DD} \cdot R_{DL}/(R_{DH}+R_{DL}), \text{ and}$$

$$U_{MAX} = R_{AG} \cdot I_{MAX}$$

$$R_{AG} = R_{DG} \cdot G_{dyn}$$

with $R_{AG} = (R_{AL} \cdot R_{AH})/(R_{AH} \cdot R_{AL})$, $R_{DG} = (R_{DL} \cdot R_{DH})/(R_{DH} + R_{DL})$, where $V_{DD}$ is the voltage level of the first and second voltage sources, $V_{CM}$ is the mean of the output voltages, $U_{MAX}$ is a predetermined maximum voltage swing, $V_{CM} = (U_{A\ out}^+ + U_{A\ out}^-)/2$, $G_{dyn}$ is the current amplification gain of the at least one dynode, and $I_{MAX}$ is the maximum charge flow from the anode over time.

6. The readout circuitry of claim 1, wherein the charge flow over time of at least one dynode charge is determined based on the one dynode nearest to the anode.

7. The readout circuitry of claim 1, wherein the charge flow over time of at least one dynode charge is determined based on at least one of the dynodes next to the one dynode nearest to the anode.

8. The readout circuitry of claim 1, wherein the first sub-circuit and the second sub-circuit are composed of only passive elements.

9. The readout circuitry of claim 1, wherein the first sub-circuitry is AC-connectable to the anode (AN) via a capacitive element ($C_A$), and the second sub-circuitry is AC-connectable to the at least one dynodes ($D_N$, $D_{N-1}$, $D_{N-2}$, ...) via at least one capacitive element ($C_{DN}$, $C_{DN-1}$, $C_{DN-2}$, ...).

10. The readout circuitry of claim 9, further comprising:
a capacitor element ($C_A$) for AC-connecting the anode (AN) to the first sub-circuitry, and
at least one further capacitor element ($C_{DN}$, $C_{DN-1}$, $C_{DN-2}$, ...), each capacitor element AC-connecting a dynode of the at least one dynode ($D_N$, $D_{N-1}$, $D_{N-2}$, ...) with the second sub-circuitry.

11. The readout circuitry of claim 1, further comprising:
a first output terminal ($A^+$) where the first output signal ($U_{A\ out}^+$) is provided, and
a second output terminal ($A^-$) where the second output signal ($U_{A\ out}^-$) is provided.

12. The readout circuitry of claim 11, wherein:
the first output terminal ($A^+$) is AC-connectable to the anode, and
the second output terminal ($A^-$) is AC-connectable to the at least one dynode.

13. The readout circuitry of claim 1, further comprising a sampling device for converting the output signals to digital signals.

14. A PMT having a cathode (CA), an anode (AN), and a plurality of dynodes ($D_N$, $D_{N-1}$, $D_{N-2}$, ...), for the measurement of nuclear radiation, comprising at least one readout circuitry of claim 8, further comprising a capacitor element ($C_A$) which AC-connects the anode (AN) to the first sub-circuitry and at least one further capacitor element ($C_{DN}$, $C_{DN-1}$, $C_{DN-2}$, ...), each capacitor element AC-connecting a dynode of the at least one dynode ($D_N$, $D_{N-1}$, $D_{N-2}$, ...) with the second sub-circuitry, said PMT connected to at least one sampling Analog to Digital Converter (ADC) for further processing of the signals from the first sub-circuitry and the second sub-circuitry.

15. A scintillation detector device (SC) comprising at least one PMT of claim 14.

16. A method for providing a pair of first and second synchronous output signals ($U_{A\ out}^+$, $U_{A\ out}^-$) from a PMT according to claim 14, the first output signal ($U_{A\ out}^+$) of the pair having a first AC portion being representative of a charge flow of an anode (AN) of the PMT over time, the second output signal ($U_{A\ out}^-$) of the pair having a second AC portion which corresponds to an inverted form of the first AC portion of the first output signal ($U_{A\ out}^+$), the first AC portion and the second AC portion forming a pair of differential signals, the method being adapted to:
derive the first output signal ($U_{A\ out}^+$) from the charge flow over time ($i_A$) of the anode (AN), and
derive the second output signal ($U_{A\ out}^-$) from a charge flow over time ($i_D$) of at least one dynode ($D_N$, $D_{N-1}$, $D_{N-2}$, ...) of the PMT.

17. The method of claim 16, wherein the first AC portion and the second AC portion form a pair of differential signals.

18. The method of claim 16, wherein the first output signal further comprises a first DC portion ($U_{CENTER} + U_{MAX}/2$) and the second output signal further comprises a second DC portion ($U_{CENTER} - U_{MAX}/2$).

19. The method of claim 18, wherein setting the first DC portion of the first output signal ($U_{A\ out}^+$) by supplying a first voltage ($V_{DD}$) to the first sub-circuitry, and setting the second DC portion of the second output signal ($U_{A\ out}^-$) by supplying a second voltage ($V_{DD}$) to the second sub-circuitry.

20. The method of claim 16, wherein the first sub-circuitry is AC-connectable to the anode (AN), and the second sub-circuitry is AC-connectable to the at least one dynode ($D_N$, $D_{N-1}$, $D_{N-2}$, ...).

21. The method of claim 16, wherein the charge flow over time of at least one dynode charge is determined based on the one dynode nearest to the anode.

22. The method of claim 16, wherein the charge flow over time of at least one dynode charge is determined based on at least one of the dynodes next to the one dynode nearest to the anode.

23. The method of claim 16, further comprising AC-connecting the first sub-circuitry to the anode (AN) via a capacitive element ($C_A$), and AC-connecting the second sub-circuitry to the at least one dynodes ($D_N$, $D_{N-1}$, $D_{N-2}$, ...) via at least one capacitive element ($C_{DN}$, $C_{DN-1}$, $C_{DN-2}$, ...).

24. The method of claim 16, further comprising:
AC-connecting the anode (AN) to the first sub-circuitry via a capacitor element ($C_A$), and
AC-connecting a dynode of the at least one dynode ($D_N$, $D_{N-1}$, $D_{N-2}$, ...) with the second sub-circuitry via at least one further capacitor element ($C_{DN}$, $C_{DN-1}$, $C_{DN-2}$, ...).

25. The method of claim 16, further comprising:
providing the first output signal ($U_{A\ out}^+$) to a first output terminal ($A^+$) of the readout circuitry, and
providing the second output signal ($U_{A\ out}^-$) to a second output terminal ($A^-$) of the readout circuitry.

26. The method of claim 16, further comprising AC-connecting the first output terminal ($A^+$) to the anode, and AC-connecting the second output terminal ($A^-$) to the at least one dynode.

27. The method of claim 16, further comprising converting the output signals to digital signals.

\* \* \* \* \*